United States Patent [19]

Bede

[11] E Re. 31,562

[45] Reissued Apr. 24, 1984

[54] HEATING VENT FOR ELECTRIC CLOTHES DRYER

[75] Inventor: James D. Bede, Bay Village, Ohio

[73] Assignee: Bede Industries, Inc., Cleveland, Ohio

[21] Appl. No.: 270,420

[22] Filed: Jun. 3, 1981

Related U.S. Patent Documents

Reissue of:

[64] Patent No.: 4,156,973
Issued: Jun. 5, 1979
Appl. No.: 839,572
Filed: Oct. 5, 1977

[51] Int. Cl.[3] ..... F26B 19/00; F16K 1/16

[52] U.S. Cl. ..... 34/86; 34/235; 165/DIG. 2; 251/303; 137/875

[58] Field of Search ..... 34/86, 235, 82, 239, 34/133; 165/DIG. 2; 251/298, 299, 303, 96, 98, 99, 158, 160, 187, 188; 137/875, 876; 126/285 R, 286, 293, 295

[56] References Cited

U.S. PATENT DOCUMENTS

| | | | |
|---|---|---|---|
| 1,813,273 | 7/1931 | Bovey | 251/303 |
| 2,579,395 | 12/1951 | Pfautsch | 251/303 |
| 2,605,076 | 7/1952 | Tanke | 137/875 |
| 3,064,360 | 11/1962 | Sholin | 34/91 |
| 3,066,423 | 12/1962 | Solem | 34/86 |
| 3,256,616 | 6/1966 | McGoldrick | 34/104 |
| 3,716,925 | 2/1973 | Hartung | 34/235 |
| 3,744,149 | 7/1973 | Helbling | 34/202 |
| 4,011,662 | 3/1977 | Davis et al. | 34/86 |
| 4,034,482 | 7/1977 | Briscoe | 34/86 |
| 4,122,612 | 10/1978 | Mrofchak | 34/86 |

FOREIGN PATENT DOCUMENTS

| | | | |
|---|---|---|---|
| 989241 | 5/1976 | Canada | 34/86 |
| 1094801 | 2/1981 | Canada . | |

OTHER PUBLICATIONS

Brochure entitled "Dryeraide" Published by Power Sales and Manufacturing Co.

*Primary Examiner*—James C. Yeung
*Attorney, Agent, or Firm*—Maky, Renner, Otto & Boisselle

[57] ABSTRACT

A heating vent is disclosed in which A T-shaped housing of light weight sheet metal is inserted in the plastic vent hose of an electric clothes dryer to provide passages through which the dryer is vented either outdoors through the vent hose or indoors through a sock-like filter having its open end stretched over the lateral outlet of the housing according to whether a pivoted valve member in the housing is in its summer or winter position.

8 Claims, 9 Drawing Figures

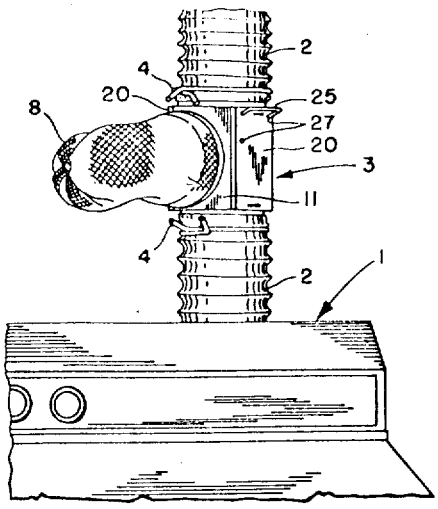
Fig. 1
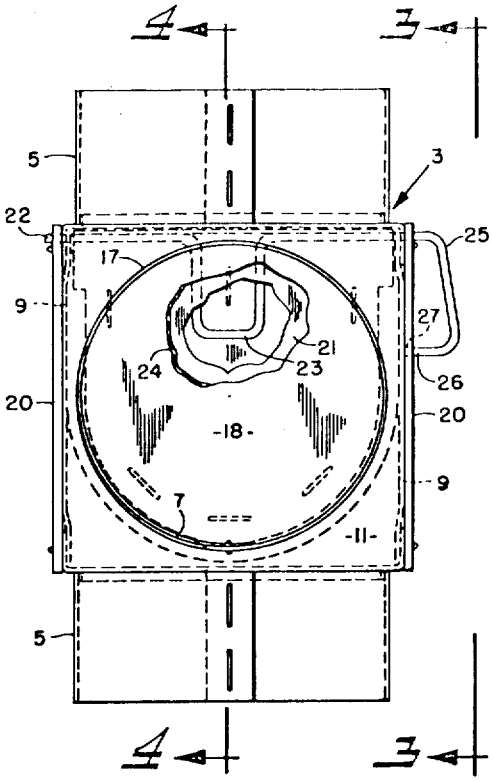
Fig. 2
Fig. 3
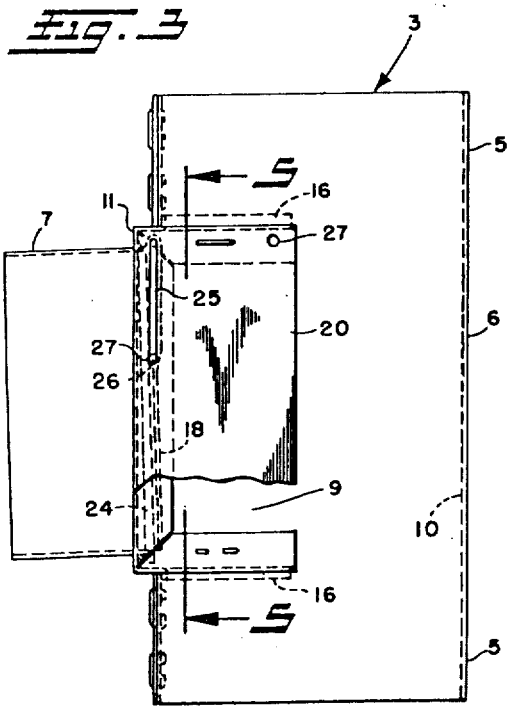
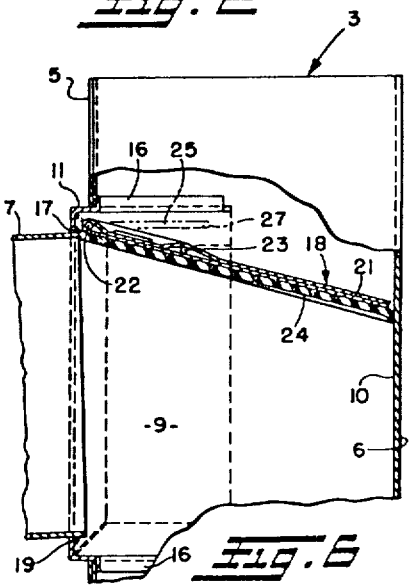
Fig. 6

HEATING VENT FOR ELECTRIC CLOTHES DRYER

Matter enclosed in heavy brackets [ ] appears in the original patent but forms no part of this reissue specification; matter printed in italics indicates the additions made by reissue.

BACKGROUND OF THE INVENTION

A typical domestic electric clothes dryer exhausts about 150 cfm of hot moisture-laden air to the outside at a temperature of about 135° F. (about 20,000 BTU/hr.) which during the winter heating season means that 150 cfm of cold outside air drawn indoors as make-up air which is first heated to room temperature by the main heating furnace and is then further heated by the clothes dryer to evaporate water from the clothes therein.

It has been proposed as in Hartung U.S. Pat. No. 3,716,925, granted Feb. 20, 1973, to provide a humidifier attachment for a clothes dryer in the form of a length of metallic vent pipe having an opening through its side wall which opens into a humidifier chamber defined between spaced-apart eccentric rings welded to the vent pipe and within a screen-supported annular filter blanket secured between the spaced-apart rings. Pivotally mounted in the vent pipe is a damper which either closes the side wall opening of the vent pipe for venting the dryer outdoors through the vent pipe or closes the downstream end portion of the vent pipe so that the dryer exhaust is conducted into the humidifier chamber through the side wall opening of the vent pipe. The damper is operated by a rod connected to the damper and extending exteriorly of the humidifier chamber between the ends of the annular filter blanket which are folded in over an axial gap in the supporting screen. In the use of this humidifier attachment, the hot moisture-laden air from the dryer flows into the humidifier chamber and is discharged into the laundry room in all directions including the wall behind the dryer.

Moreover, the proposed humidifier attachment is quite heavy and bulky and is expensive to manufacture and does not lend itself for suspension from plastic vent hose which is in prevalent use in conjunction with electric clothes dryers.

SUMMARY OF THE INVENTION

The heating vent herein for electric clothes dryers is of compact, lightweight and economical to manufacture construction, the same being fabricated from thin prefinished aluminum sheet stock to provide a T-shaped housing adapted to be inserted in and suspended by a plastic vent hose for outdoor venting of the dryer when a pivoted valve member in the housing is in its summer position closing the lateral outlet of the housing. For indoor venting of the dryer, the lateral outlet of the T-shaped housing may be positioned to direct the hot moisture-laden air toward an open door in the laundry room away from the dryer inlet, the lateral outlet of the T-shaped housing having stretched thereover the open end of a sock-like nylon or like material filter.

The heating vent herein is further characterized in that the pivoted valve member in the housing has a resilient seat which, within its periphery, engages an annular seat of the lateral outlet in the summer position of the valve member and which, at its periphery, engages the interior wall of the housing in the winter position of the valve member.

Yet another characterizing feature of the heating vent herein is the provision of a novel detent mechanism which releasably locks the valve member in either its summer or winter position and at the same time biases the valve member to its seated summer or winter position.

BRIEF DESCRIPTION OF THE DRAWING

FIG. 1 is a perspective view of the upper portion of an electric clothes dryer showing the heating vent herein installed in the plastic vent hose of the dryer;

FIG. 2 is a front elevation view of the heating vent with the filter at the lateral outlet being omitted, the valve member being shown in its summer position and with portions of the valve member broken away to illustrate its construction;

FIG. 3 is a side elevation view as viewed from the line 3—3 of FIG. 2;

FIG. 6 is a cross section view similar to FIG. 4 except showing the valve member in its winter position closing the downstream end of the housing vent passage and opening communication between the upstream portion of the vent passage and the lateral outlet.

DETAILED DESCRIPTION OF A PREFERRED EMBODIMENT

Figure 4:
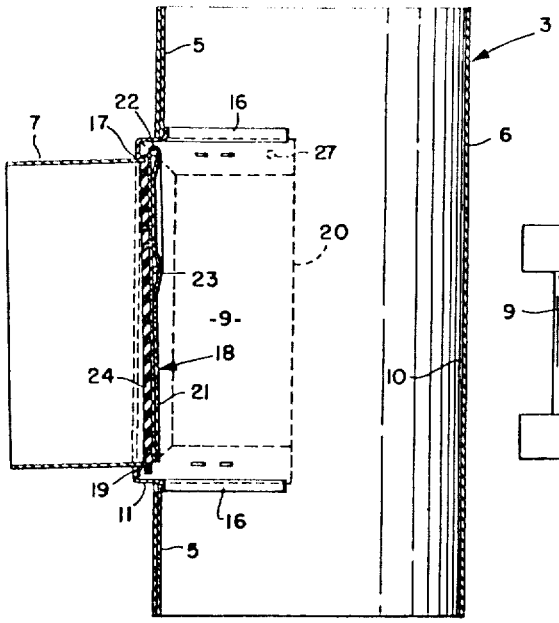
FIG. 4 is a vertical cross section view as viewed along the line 4—4 of FIG. 2.

Referring first to FIG. 1, the electric clothes dryer 1 has an upwardly extending plastic vent hose 2 in which the heating vent 3 constituting the present invention is connected by spring clamps 4 which clamp the ends of the plastic vent hose 2 around the nipples 5 at the upper and lower ends of the vent housing 6. The lateral outlet of the vent 3 is defined by a tubular nipple 7 over which is stretched the open end of a sock-like nylon or like filter 8, the vent housing 6 preferably being angularly oriented about its vertical axis so as to direct the hot moist air coming out of the outlet 7 and through the filter 8 toward an open door in the laundry room and away from the dryer air inlet.

The heating vent 3 as shown in FIG. 1 is in its winter position to prevent hot moist air from the dryer 1 from passing through the upper end of the plastic vent hose 2 into the outside atmosphere and instead such hot moist air is exhausted indoors through the filter 8 to save energy and to humidify the normally dry winter air. By so discharging the hot moist air indoors, it is not necessary to provide make-up air from outdoors which is first heated to room temperature and then further heated during operation of the dryer 1.

The heating vent 3 herein is preferably fabricated from thin aluminum sheet stock (0.012 inch thickness for example) by a steel rule die stamping process so that the total weight of the heating vent 3 for 4 inch diameter plastic vent hose 2 is less than about 6 oz.

Figure 7:
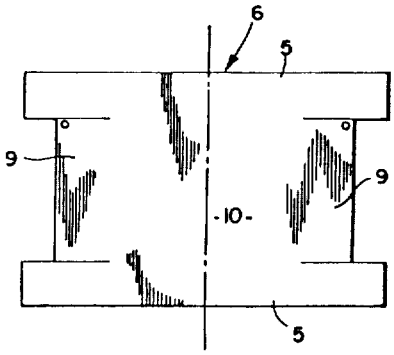
FIGS. 7, 8 and 9 are plan views illustrating the housing parts (FIGS. 7 and 8) and the valve member (FIG. 9) in flat form as cut by steel rule dies.

The main housing part 6 in flat form as cut by the steel rule die (see FIG. 7) has upper and lower portions 5 which, when formed into 4 inch diameter cylinders, have overlapped end portions which are stapled together as best shown in FIGS. 2 and 3 to form the nipples 5 to receive the end portions of the plastic vent hose 2 for clamping by the spring clamps 4. The intermediate portions 9 of the housing part 6 constitute opposite side walls 9 which are parallel to each other and tangent to the semi-cylindrical portion 10 of the housing 6 between the tubular nipples 5.

Figure 8:
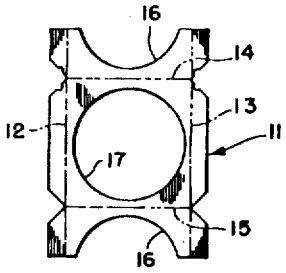
Figure 5:
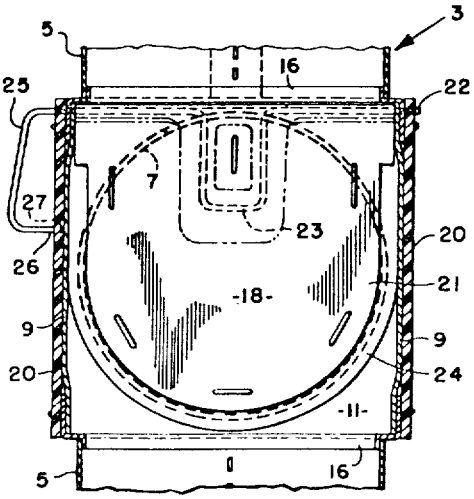
FIG. 5 is a partial cross section view as viewed along the line 5—5 of FIG. 3.

As shown in FIG. 8, the housing part 11 in flat form is steel rule die-stamped and then is bent at right angles along the lines 12, 13, 14, and 15 to provide flanges which embrace the upper and lower and outer portions of the opposite side walls 9 and in addition, the curved end portions 16 of the housing part 11 which extend radially inward of the nipples 5 are bent or curled as best shown in FIG. 4.

The housing part 11 has secured in the circular opening 17 thereof the tubular nipple 7 which is formed from a rectangular strip of [block] *stock* having overlapped ends which are stapled together as shown in FIG. 2.

As shown in FIG. 4 and also FIG. 6, the inner end of the nipple 7 projects inwardly of the opening 17 in the housing part 11 to form an annular seat for the valve member 18. The axis of the tubular nipple 7 is slightly inclined as shown for a reason which will hereinafter be explained. The nipple 7 and housing part 11 are secured together in fluid tight relation preferably by wrapping a hot melt extruded plastic string or strip 19 around the joint and passing the housing part 11 and nipple 7 through a heating oven to cure the strip 19 and to bond the two parts together in fluid tight relation.

On opposite sides of the housing assembly 6, 11 are rectangular pieces 20 of polyethylene or like plastic material. The side wall portions 9 of the housing part 6, the flanges of the housing part 11 and the pieces 20 are secured together as by upper and lower staples.

Figure 9:
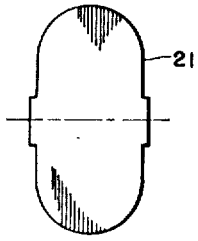

The valve member 18 comprises a plate 21 of thin aluminum which is steel rule die-stamped as shown in FIG. 9 and which is folded over a valve operating rod or wire 22 having an offset portion 23, the two thicknesses of the valve plate 21 being stapled together at several places as shown with the valve operating rod 22 and its offset portion 23 therebetween. The side pieces 20 and the housing parts 6 and 11 have registering openings constituting bearings for the valve operating rod 22 for swinging movement of the valve member 18 between the FIG. 4 and FIG. 6 positions. To insure a fluid-tight seal, the plate 21 of the valve member 18 has secured as by pressure sensitive adhesive a resilient seat member 24 made as of ⅛ inch thick closed cell neoprene or the like, there being no pressure sensitive adhesive on the portions of the seat member 24 which project beyond the periphery of the plate 21 so as not to interfere with low friction movement of the valve member 18.

The valve operating rod 22 is bent as shown in FIG. 2 to provide a convenient handle 25 for pivoting the valve member 18 between its winter and summer positions. The end 26 of the handle 25 constitutes a detent to spring axially into one or the other of the holes 27 in one side piece 20 to securely lock the valve member 18 in its summer position as shown in FIG. 4 or in its winter position as shown in FIG. 6. In addition, the angular spacing of the holes 27 is greater than the angle of swinging of the valve member 18 between the aforesaid positions so that the valve operating rod 22 is under a torque load to bias the valve member 18 in seating direction in both positions thereof.

In the summer position shown in FIG. 4, the resilient seat member 24 engages the annular seat of the tubular nipple 7 within its periphery, while in the winter position the periphery of the seat member 24 makes sealed engagement with the interior wall 10 and the parallel side walls 9 of the housing part 6.

For convenience, the aforesaid detent openings 27 may be spaced 90° apart and therefore the inclination of the seat of the nipple 7 provides the bias aforesaid and, of course, the movement of the valve member 18 toward winter position stops short of horizontal and therefore the bias is obtained when the end 26 of the valve operating handle 25 is engaged with the winter position hole 27.

During the heating season, the valve member 25 is preferably left in the winter position of FIG. 6 to prevent loss of heat through the vent hose 2 when the dryer 1 is not in use. Furthermore, by keeping the valve member 25 in the winter position when the dryer 1 is not in use whether in summertime or wintertime, rodents and insects are prevented from entering indoors through the vent hose 2 and dryer 1. Moreover, by keeping the valve member 25 in winter position when the dryer 1 is not in use during the summer months, there is a savings in air conditioning load.

When the outside vent is above the dryer 1, the heating vent 3 because of its light weight may be simply suspended from the plastic vent hose 2 without necessity of securing the same to a wall behind the dryer 1. When the outside vent is near floor level, it may in some cases be necessary to employ so-called "plumbers tape" (perforated metal strip) to embrace the lower nipple 5, the tape being secured as by screws to the wall behind the dryer 1 to support the heating vent 3 either above or to the side of the dryer 1.

I, therefore, particularly point out and distinctly claim as my invention:

1. A heating vent for a clothes dryer comprising a housing adapted to be interposed in the dryer vent hose; said housing having a passage for outdoor venting of the dryer exhaust through said vent hose, and having a lateral outlet passage for indoor venting of the dryer exhaust; a valve member pivotally connected in said housing for selective positioning to close said outlet passage for outdoor venting through said vent hose and housing passage or to close the downstream end of said housing passage for indoor venting of the dryer exhaust from the upstream end of said passage through said outlet passage; said valve member having operating means therefor located exteriorly of said housing and extending radially from the pivot axis of said valve member alongside one side of said housing; said operating means and housing having cooperating detent means to releasably lock said valve member in the aforesaid positions while resiliently biasing said valve member to the respective positions; said housing comprising a main housing part of lightweight sheet material sheared and bent to provide tubular nipples at its opposite ends with circumferentially overlapping ends secured together for clamping of the end portions of the vent hose thereto and to provide an intermediate semi-cylindrical wall coaxial with and of the same diameter as said nipples and parallel side walls tangent to said semi-cylindrical wall; a laterally extending housing part of lightweight sheet material sheared and bent to provide axially spaced apart end walls and a radially outer wall having flanges overlying the axial end portions of said side walls and the radially outer end portions of said side walls; said end walls having semi-cylindrical flanges extending within the respective nipples; said radially outer wall having an opening in which a laterally extending tubular nipple of lightweight strip material is secured to constitute said lateral outlet passage over which the open end of a sock-like filter is adapted to be stretched; said operating means comprising a rod pivotally engaged in openings in opposite sides of said housing adjacent the junction of said radially outer wall with one end wall and having an intermediate offset portion secured to said valve member for swinging of the latter in response to pivoting of said rod; said rod being bent to extend alongside one side of said housing and terminating in an end portion yieldably engaging said one side of said housing; said detent means comprising angularly spaced apart recesses in said one side of said housing into which said end portion of said rod resiliently snaps to lock said valve member in the respective housing passage and outlet passage closing positions; the angular spacing of said recesses being greater than the angle of swinging of said valve member from one position to the other whereby a torque load on said rod resiliently biases said valve member to the respective positions.

2. The heating vent of claim 1, wherein said valve member comprises a plate-like member folded over said rod between the opposite sides of said housing and over said offset portion of said rod; and a resilient seat member secured to one side of said plate-like member; said laterally extending tubular nipple extending inwardly of said radially outer wall to constitute an annular seat which is resiliently engaged by said seat member within its periphery when said valve member is in outlet passage closing position; said seat member having a semicircular edge portion and tangential parallel side edges which are in resilient engagement with the interior wall of said housing when said valve member is in a position closing the downstream end of said housing passage.

3. The heating vent of claim 2 wherein rectangular pieces of plastic material constitute opposite sides of said housing stapled to the axial end portions of said side walls and to the flanges thereat; one of said pieces having openings constituting said recesses.

*4. A heating vent for a clothes dryer comprising:*

*a housing adapted to be interposed in the dryer vent hose, said housing having*

*a first nipple forming an inlet passage to receive exhaust air from the dryer through a first section of hose clamped thereto, a irected indoors; ing an outdoor outlet passage for selective outdoor venting of said exhaust air through a second section of vent hose clamped thereto, and*

*a third lateral nipple forming a lateral outlet passage for selective indoor venting of such exhaust air;*

*a sock-like filter mountable on the downstream end of said third*

*a valve member pivotally connected in said housing for selective arcuate movement to a first position to close said lateral outlet passage thereby to provide fluidic communication between said first and second nipples for outdoor venting or alternatively to a second position to close the outdoor outlet passage thereby to provide fluidic communication between said first nipple and said third lateral nipple for indoor venting;*

*pivotal operating means connected to said valve member and extending exteriorly of said housing having*

*a handle member thereon extending generally radially of the pivot axis of said valve member along one side of said housing with pivotal movement of said handle member arcuately swinging the valve member between its first and second positions;*

*angularly spaced detent means on said one side of said housing cooperating with and selectively holding said handle means at opposite ends of its pivotal movement to apply a torque load on said valve member positively to close the lateral outlet passage or the outdoor outlet passage, the angular spacing of said detent means being greater than the angle of arcuate movement for the valve member between its two positions to apply said torque load to said valve member positively to bias the valve member into either its first or second closing position when the handle means is held by the detent means at the corresponding position of the handle means.*

*5. The heating vent of claim 4 wherein said valve means has a resilient seat material secured to one side of said valve member to provide a resilient seal between said valve member and said housing when said valve member is in either its first or second position.*

*6. The heating vent of claim 5 wherein the housing has a semi-cylindrical section between and smoothly joining the first and second nipples and has a lateral outlet section emanating from the semi-cylindrical section for said third lateral nipple, the side walls of said lateral outlet section being generally tangent to said semi-cylindrical section.*

*7. The heating vent of claim 5 or 6 wherein said valve member in said second position has an angular orientation slightly downwardly toward said first nipple to provide a smooth angled transition of exhaust air from said first nipple to said third lateral nipple.*

*8. A heating vent for a clothes dryer comprising:*

*a housing adapted to be interposed in the dryer vent hose, said housing having*

*a first nipple forming an inlet passage to receive exhaust air from the dryer through a first section of hose clamped thereto, a second nipple forming an outdoor outlet passage for selective outdoor venting of such exhaust air through a second section thereto, and a third lateral nipple forming a lateral outlet passage for selective indoor venting of such exhaust air; a downstream end of said third lateral nipple being adapted to receive an open end of a sock-like filter to filter the exhaust air selectively directed indoors;*

*a valve member pivotally connected in said housing for selective arcuate movement to a first position to close said lateral outlet passage thereby to provide fluidic communication between said first and second nipples for outdoor venting or alternatively to a second position to close the outdoor outlet passage thereby to provide fluidic communication between said first nipple and said third lateral nipple for indoor venting; pivotal operating means connected to said valve member and extending exteriorly of said housing having*

*a handle member thereon extending generally radially of the pivot axis of said valve member along one side of said housing with pivotal movement of said handle member arcuately swinging the valve member between its first and second positions;*

*angularly spaced detent means on said one side of said housing cooperating with and selectively holding said handle means at opposite ends of its pivotal movement to apply a torque load on said valve member positively to close the lateral outlet passage or the outdoor outlet passage, the angular spacing of said detent means being greater than the angle of arcuate movement for the valve member between its two positions to apply said torque load to said valve member positively to bias the valve member into either its first or second closing position when the handle means is held by the detent means at the corresponding position of the handle means.*

* * * * *